United States Patent
Sugimoto

(10) Patent No.: US 9,149,764 B2
(45) Date of Patent: Oct. 6, 2015

(54) AIR-PURIFYING DEVICE FOR VEHICLES

(71) Applicant: Kazuhiro Sugimoto, Susono (JP)

(72) Inventor: Kazuhiro Sugimoto, Susono (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 3 days.

(21) Appl. No.: 14/226,161

(22) Filed: Mar. 26, 2014

(65) Prior Publication Data

US 2014/0322084 A1    Oct. 30, 2014

(30) Foreign Application Priority Data

Apr. 26, 2013   (JP) .................... 2013-094165

(51) Int. Cl.
| | |
|---|---|
| *B01J 37/34* | (2006.01) |
| *B01J 20/00* | (2006.01) |
| *B01D 50/00* | (2006.01) |
| *B01D 24/00* | (2006.01) |
| *B01D 53/02* | (2006.01) |
| *B01D 53/66* | (2006.01) |
| *B01D 53/86* | (2006.01) |
| *B01D 53/94* | (2006.01) |

(52) U.S. Cl.
CPC ............ *B01D 53/66* (2013.01); *B01D 53/8675* (2013.01); *B01D 53/9495* (2013.01); *B01D 2251/2062* (2013.01); *B01D 2252/103* (2013.01); *B01D 2255/702* (2013.01); *B01D 2255/9207* (2013.01); *B01D 2257/106* (2013.01); *B01D 2258/06* (2013.01); *B01D 2259/4566* (2013.01)

(58) Field of Classification Search
CPC .......... A61L 9/00; A61L 9/205; B01D 53/02; B01J 20/00; B01J 35/004
USPC .......... 422/177, 311; 55/522; 96/108; 502/5, 502/20, 400
See application file for complete search history.

(56) References Cited

U.S. PATENT DOCUMENTS

| | | | |
|---|---|---|---|
| 7,567,884 B2 | 7/2009 | Busch et al. | |
| 2001/0019707 A1* | 9/2001 | Okayama et al. | ............. 422/177 |
| 2005/0193799 A1 | 9/2005 | Choi | |
| 2010/0067560 A1 | 3/2010 | Kouda et al. | |

FOREIGN PATENT DOCUMENTS

| | | |
|---|---|---|
| EP | 1645324 A1 | 4/2006 |
| JP | 2001-247017 A | 9/2001 |
| JP | 2001-347829 A | 12/2001 |
| JP | 2005-345461 A | 12/2005 |
| JP | 2010-000848 A | 1/2010 |
| JP | 2010-029816 A | 2/2010 |
| JP | 2010-071080 A | 4/2010 |

* cited by examiner

*Primary Examiner* — Monzer R Chorbaji
(74) *Attorney, Agent, or Firm* — Gifford, Krass, Sprinkle, Anderson & Citkowski, P.C.

(57) ABSTRACT

An air-purifying device for vehicles capable of diagnosing function deterioration of an ozone purifier with an inexpensive configuration is provided. At Step 120, applying current to an injector 20 is started. As a result, injection of ammonia from the injector 20 is started. Subsequently, it is determined whether or not i a heat generation amount is more than a predetermined amount A (Step 130). In the case of the heat generation amount>predetermined amount A, it can be determined that there are a large number of pores (fine pores) of activated carbon supporting a deterioration detection substance. In the case of the heat generation amount≤predetermined amount A, it can be determined that fine pores have decreased and an ozone purifying function of the activated carbon has deteriorated. Thus, an MIL 30 is lighted (Step 140).

10 Claims, 11 Drawing Sheets

AIR-PURIFYING DEVICE FOR VEHICLES

BACKGROUND OF THE INVENTION

1. Field of the Invention

The present invention relates to an air-purifying device for vehicles and particularly to an air-purifying device for vehicles capable of purifying ozone in atmospheric air.

2. Description of the Related Art

In prior-art air purifying using an ozone purifier having a function of purifying ozone, function deterioration caused by long-term use has been known, and various researches/development have been made regarding diagnosis of this function deterioration. For example, Japanese Patent Laid-Open No. 2001-347829 discloses an air-purifying device for vehicles in which an ozone concentration sensor is provided on the front and rear of a radiator in which an ozone purifier using manganese carbonate and manganese oxide as main components is provided, and function deterioration of the ozone purifier is diagnosed by using their sensor outputs. In this air-purifying device, if a ratio of outputs between the sensors on the front and the rear of the radiator falls to approximately a half of an initial value (a ratio of outputs of the both sensors at shipment), it is diagnosed that the function of the ozone purifier has deteriorated.

However, ozone concentration in the air is generally as low as 1 ppm or less. Thus, in order to detect ozone concentration by using a sensor, a sensor with high accuracy is required. Thus, with Japanese Patent Laid-Open No. 2001-347829 in which an ozone concentration sensor is provided on the front and rear of the radiator, there is a problem that a cost increase caused by mounting sensors cannot be avoided.

SUMMARY OF THE INVENTION

It is therefore an object of the present invention to provide an air-purifying device for vehicles which can diagnose function deterioration of an ozone purifier with an inexpensive configuration.

According to a first aspect of the present invention, the air-purifying device for vehicles comprises an on-vehicle component arranged on a portion where an air flow passage is formed while a vehicle is traveling; an ozone purifier provided on the on-vehicle component and containing activated carbon having a function of purifying ozone, and a deterioration detection substance supported by pores of the activated carbon and detecting deterioration of the activated carbon; obtaining means for obtaining a parameter which is set in accordance with a property of the deterioration detection substance; and diagnosing means for diagnosing deterioration of the function by comparing the parameter with a predetermined threshold value.

Activated carbon can purify ozone by using its pores whereas loses the pores with the ozone purification and deteriorates. In this respect, the parameter of the first aspect of the present invention is set in accordance with a property of the deterioration detection substance and can be obtained with an inexpensive configuration as compared with the ozone concentration sensor. Therefore, function deterioration of the ozone purifier can be diagnosed with an inexpensive configuration.

According to a second aspect of the present invention, the deterioration detection substance may have a property of generating heat by chemical reaction with ammonia or water. The air-purifying device for vehicles may comprise injecting means for injecting ammonia or water toward the ozone purifier. And the obtaining means may obtain, as the parameter, a heat generation amount of the deterioration detection substance generated by injection from the injecting means.

If the deterioration detection substance has a property of generating heat by chemical reaction with ammonia or water, a heat generation amount of the deterioration detection substance can be set as the parameter. The heat generation amount can be obtained with an inexpensive configuration as compared with the ozone concentration sensor. Therefore, function deterioration of the ozone purifier can be diagnosed with an inexpensive configuration.

According to a third aspect of the present invention, the deterioration detection substance may have a property of absorbing light with a specific wavelength and emitting light. The air-purifying device for vehicles may comprise irradiating means for irradiating light with the specific wavelength toward the ozone purifier. And the obtaining means may obtain, as the parameter, light emission intensity of the deterioration detection substance emitted by light irradiation from the irradiating means.

If the deterioration detection substance has a property of absorbing light with a specific wavelength and emitting light, light emission intensity of the deterioration detection substance can be set as the parameter. The light emission intensity can be obtained with an inexpensive configuration as compared with the ozone concentration sensor. Therefore, function deterioration of the ozone purifier can be diagnosed with an inexpensive configuration.

According to a forth aspect of the present invention, the on-vehicle component may be a radiator.

In this arrangement, ozone purifying using the activated carbon can be performed efficiently by heat exchange with coolant flowing through the radiator.

According to a fifth aspect of the present invention, the diagnosing means may further be provided with alarm means for alarming to the outside when the function is diagnosed to have deteriorated.

In this arrangement, appropriate measures can be taken when the ozone purifier deteriorates.

According to a sixth aspect of the present invention, the air-purifying device for vehicles comprises an on-vehicle component arranged on a portion where an air flow passage is formed while a vehicle is traveling; an ozone purifier provided on the on-vehicle component and containing activated carbon having a function of purifying ozone, and a deterioration detection substance supported by pores of the activated carbon and detecting deterioration of the activated carbon; a processor; and a memory storing a program which is a control program executed by the processor and diagnoses deterioration of the function by obtaining a parameter which is set in accordance with a property of the deterioration detection substance and by comparing the parameter with a predetermined threshold value.

As discussed previously, the parameter is set in accordance with a property of the deterioration detection substance and can be obtained with an inexpensive configuration as compared with the ozone concentration sensor. Therefore, function deterioration of the ozone purifier can be diagnosed with an inexpensive configuration.

According to a seventh aspect of the present invention, the deterioration detection substance may have a property of generating heat by chemical reaction with ammonia or water. The air-purifying device for vehicles may comprise an injector injecting ammonia or water toward the ozone purifier. And the parameter may be a heat generation amount of the deterioration detection substance generated by injection from the injector.

As discussed previously, the heat generation amount can be obtained with an inexpensive configuration as compared with the ozone concentration sensor. Therefore, function deterioration of the ozone purifier can be diagnosed with an inexpensive configuration.

According to an eighth aspect of the present invention, the deterioration detection substance may have a property of absorbing light with a specific wavelength. The air-purifying device for vehicles may comprise a light emitting portion irradiating light with the specific wavelength toward the ozone purifier. And the parameter may be light emission intensity of the deterioration detection substance emitted by light irradiation from the light emitting portion.

As discussed previously, the light emission intensity can be obtained with an inexpensive configuration as compared with the ozone concentration sensor. Therefore, function deterioration of the ozone purifier can be diagnosed with an inexpensive configuration.

According to an eighth aspect of the present invention, the on-vehicle component may be a radiator.

In this arrangement, ozone purifying using the activated carbon can be performed efficiently by heat exchange with coolant flowing through the radiator.

According to a tenth aspect of the present invention, the air-purifying device for vehicles may comprise an MIL being lighted by a signal from the processor. And the program may light the MIL when the function is diagnosed to have deteriorated.

In this arrangement, appropriate measures can be taken when the ozone purifier deteriorates.

DETAILED DESCRIPTION OF THE INVENTION

First Embodiment

First, a first embodiment of the present invention will be described by referring to FIGS. 1 to 7.

Configuration of Air-Purifying Device for Vehicles

Figure 1:
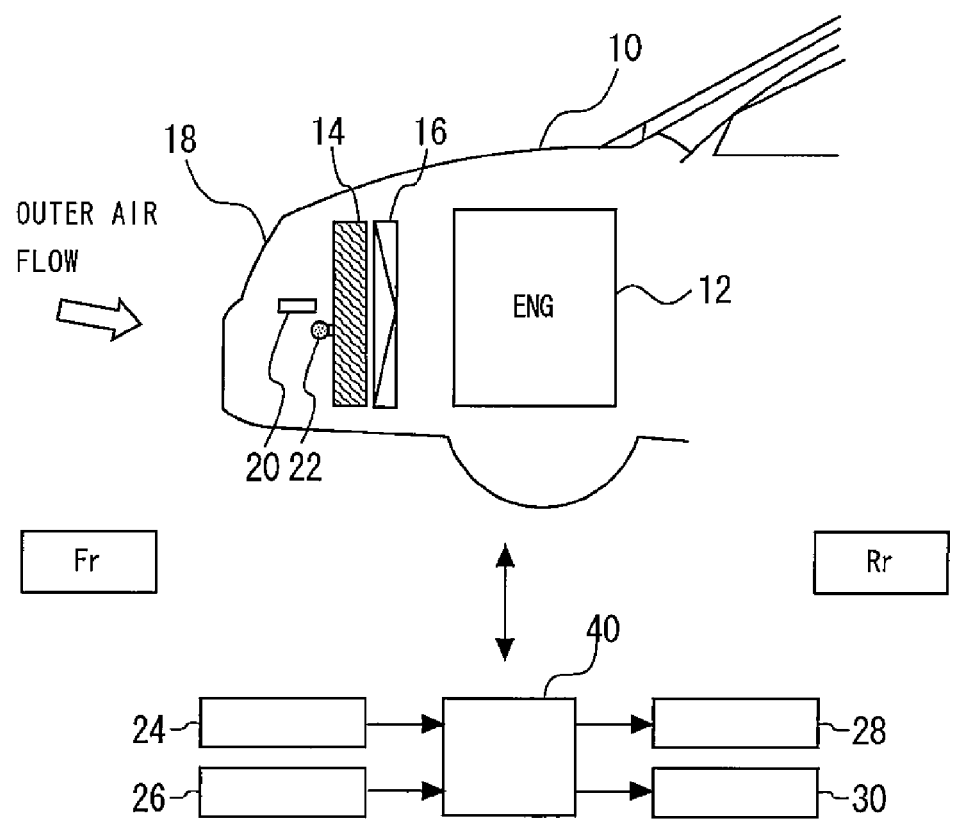
FIG. 1 is a diagram illustrating a configuration of a vehicle on which an air-purifying device of the first embodiment is mounted.

FIG. 1 is a diagram illustrating a configuration of a vehicle on which an air-purifying device of the first embodiment is mounted. As illustrated in FIG. 1, the vehicle 10 is provided with an engine 12 as a power source. An exhaust gas exhausted from the engine 12 contains HC and NOx. Ozone is generated by photochemical reaction using HC and NOx as reactants. Thus, by adding a function of purifying ozone to components of the vehicle 10, ozone in the air can be purified during running of the vehicle 10, and an influence of the vehicle 10 to the environment can be reduced.

As the component, a radiator 14 for cooling coolant to be circulated in the engine 12 is arranged on the front of the engine 12. An ozone purifier is coated with a core of the radiator 14. The ozone purifier contains activated carbon having an ozone purifying function as a main component. However, other substances having that function, that is, porous materials such as zeolite or metal oxides such as manganese dioxide, for example, may be contained as sub-components.

The ozone purifier further contains a substance for detecting deterioration of the activated carbon (hereinafter referred to as "deterioration detection substance"). The deterioration detection substance is distributed and supported on the surface and in the pores of the activated carbon. The deterioration detection substance is a metal chloride having properties of generating heat by storing (coordinating) ammonia while absorbing heat by emitting (desorbing) it. The metal chloride is mainly composed of one or more types of alkali metal elements, alkali earth metal elements or transition metal elements and chlorine. Specific metal chlorides include $MgCl_2$, $CaCl_2$, $SrCl_2$, $BaCl_2$, $MnCl_2$, and $CoCl_2$, $NiCl_2$. Among them, $CaCl_2$ and $BaCl_2$ capable of emitting ammonia under a condition of a temperature lower than a coolant temperature (80 to 100° C.) made to flow through the radiator 14 are preferable.

On the rear of the radiator 14, a radiator fan 16 is mounted. The radiator fan 16 is mounted with a purpose of improvement of cooling efficiency of coolant made to flow through the radiator 14. When the radiator fan 16 is rotated, air on the front of the radiator 14 passes through the radiator 14 and is sucked out to the engine 12 side.

On the front of the radiator 14, a radiator grill 18 is provided. In the radiator grill 18, an opening portion (not shown) for introducing the air to the front of the radiator 14 during running of the vehicle 10 is formed.

Between the radiator 14 and the radiator grill 18, an injector 20 and a temperature sensor 22 are provided. The injector 20 is a solenoid driving injector connected to a tank (not shown) storing ammonia. The injector 20 is configured to inject a predetermined amount (several ml) of ammonia to a predetermined region in the ozone purifier. The temperature sensor 22 is configured to continuously measure the temperature of the predetermined region. As the temperature sensor 22, a thermocouple is used for example, and its temperature-measuring junction is provided on the surface of the ozone purifier or the core of the radiator 14.

Moreover, the vehicle 10 is provided with an ECU (Electronic Control Unit) 40. The ECU 40 is provided with a CPU, a ROM, a RAM and the like and also is an electronic control unit controlling the entire operation of the system including the air-purifying device. The ECU 40 is configured capable of executing deterioration diagnosis control processing which will be described later in accordance with a control program stored in the ROM.

To the input side of the ECU 40, a car speed sensor 24 detecting a speed of the vehicle 10 (hereinafter referred to as a "car speed"), a water temperature sensor 26 detecting a temperature of the coolant and the like are connected in addition to the above-described temperature sensor 22. To the output side of the ECU 40, a thermostat 28 allowing or prohibiting flowing of the coolant into the radiator 14, an MIL (Malfunction Indication Lamp) 30 arranged on an instrument panel (not shown) of the vehicle 10 and the like are connected in addition to the above-described radiator fan 16 and the injector 20. There are a large number of actuators and sensors connected to the ECU 40 other than those illustrated in the figure, but the description will be omitted in this specification.

Deterioration of Activated Carbon

Activated carbon has ozone purifying performances comparable to known purifiers such as manganese dioxide and the like and is also available inexpensively and thus, it is promising as a substitute for the purifiers. Moreover, activated carbon can purify not only in a coolant temperature area (usually between 80 to 100° C.) where the coolant is allowed to flow through a radiator but also in a coolant temperature area (approximately 25° C.) where the coolant is prohibited to flow through the radiator. Thus, activated carbon is more useful than the above-described purifiers requiring a high temperature condition (80° C. or above) for purifying of ozone.

Figure 2:
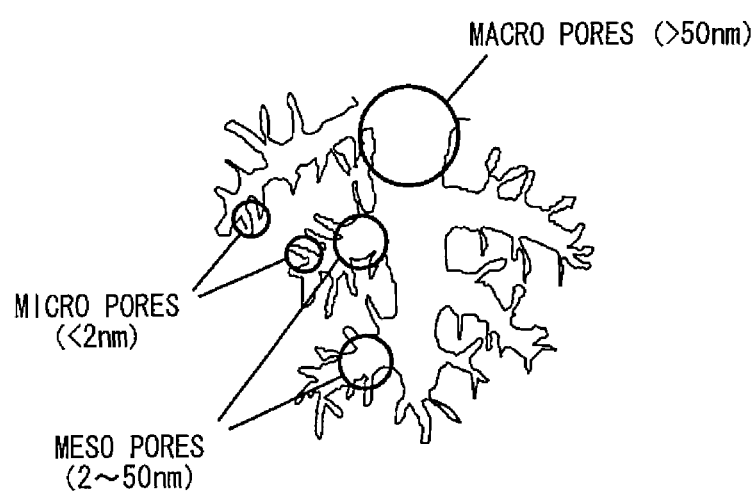
FIG. 2 is a diagram illustrating an internal structure of activated carbon.

FIG. 2 is a diagram illustrating an internal structure of activated carbon. As illustrated in FIG. 2, activated carbon has pores formed in a large number from the surface to the inside. These pores are classified by its size into macro pores (pore diameter of 50 nm or more), mesopores (pore diameter of 2 to 50 nm), and micro pores (pore diameter of 2 nm or less).

Ozone is purified by the activated carbon as the result of entry of ozone into the pores. Specifically, ozone having entered the pores receives electrons from a pore internal wall at the entry destination and then is converted to oxygen and the like ($O_3 \rightarrow O_2$). In this conversion reaction, the activated carbon functions as a catalyst. Moreover, ozone having entered the pores reacts with the pore internal wall at the entry destination and then is converted to carbon monoxide, carbon dioxide and the like ($C+O_3 \rightarrow CO, CO_2, O_2$). In this conversion reaction, the activated carbon is consumed. That is, ozone is purified by going through the two types of conversion reaction in the activated carbon.

Figure 3:
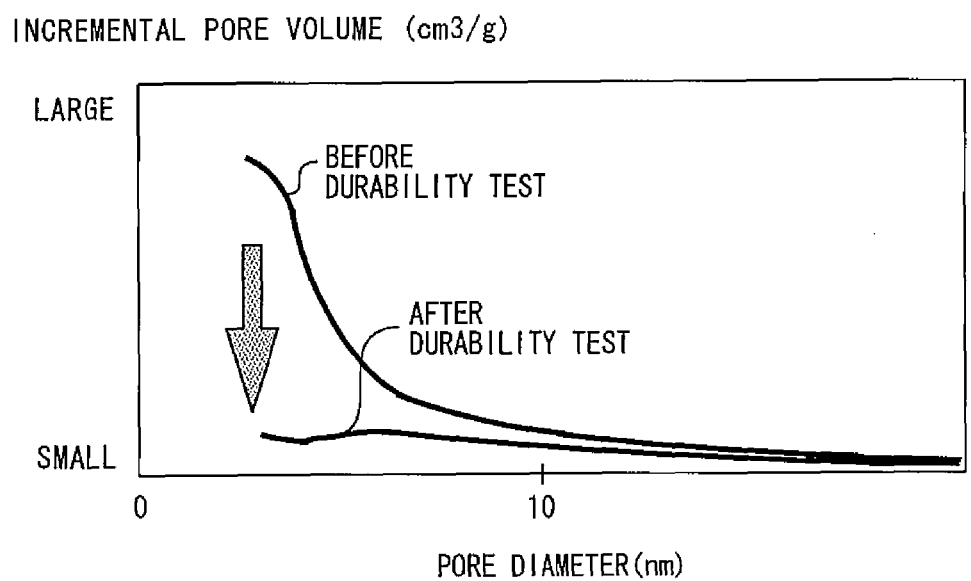
FIG. 3 is a diagram illustrating a change of incremental pore volume ($cm^3/g$) of the activated carbon before and after a durability test.

FIG. 3 is a diagram illustrating a change of incremental pore volume ($cm^3/g$) of the activated carbon before and after a durability test. This durability test was conducted by making a gas containing ozone with certain concentration pass from the front to the rear of the activated carbon (test piece). As illustrated in FIG. 3, after the durability test, the incremental pore volume largely decreases from that before the durability test. This tendency is more remarkable in an area with a smaller pore diameter and particularly remarkable in an area with the pore diameter smaller than 10 nm. This indicates that a consumption reaction in the above-described conversion reaction progresses and as a result, mesopores and micro pores each having a pore diameter of 10 nm or less (hereinafter referred to as "fine pores") have lost.

Figure 4:
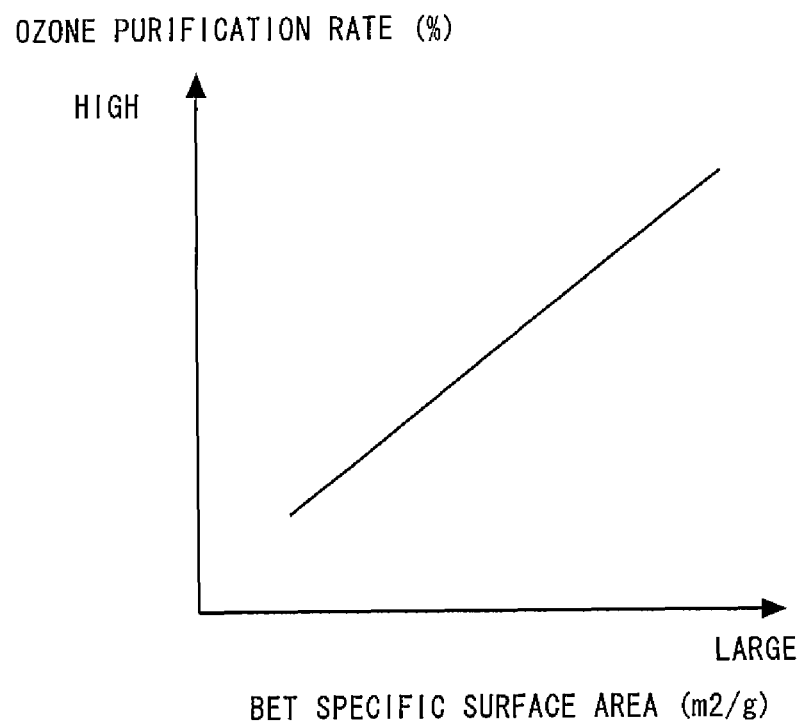
FIG. 4 is a diagram illustrating a relationship between a BET specific surface area ($m^2/g$) of the activated carbon and an ozone purification rate (%).

FIG. 4 is a diagram illustrating a relationship between a BET specific surface area ($m^2/g$) of the activated carbon and an ozone purification rate (%). The ozone purification rate in FIG. 4 was calculated by measuring the ozone concentration before and after the activated carbon (test piece) (ozone purification rate=rear ozone concentration/front ozone concentration). As illustrated in FIG. 4, as the BET specific surface area increases, the ozone purification rate rises. Here, if the mesopores and micro pores in the activated carbon are lost, the BET specific surface area decreases. That is, if the consumption reaction of the activated carbon progresses and the fine pores are lost, the ozone purifying function of the activated carbon lowers. In view of such properties, deterioration diagnosis control described below is carried out in this embodiment.

Deterioration Diagnosis Control

Figure 5:
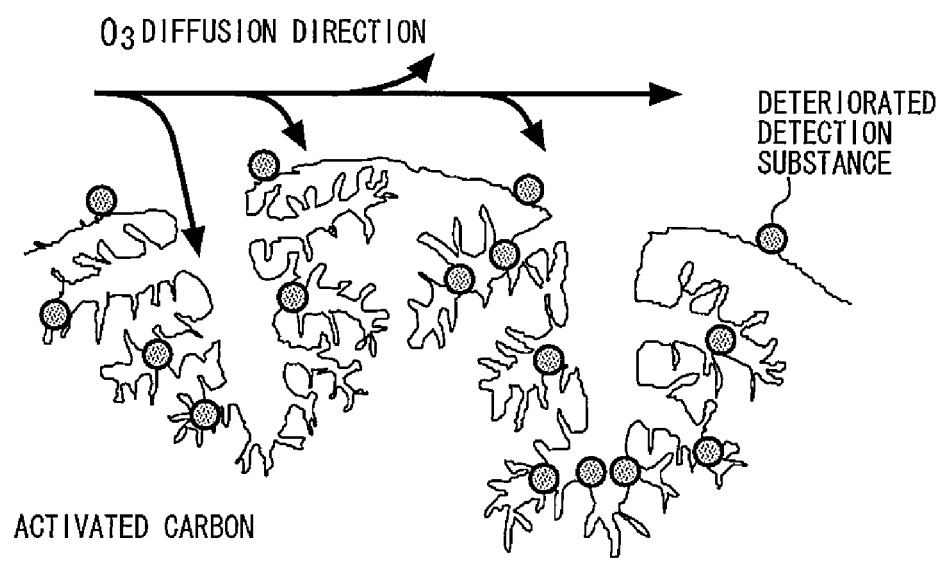
FIG. 5 is a support image diagram of the deterioration detection substance.

The deterioration diagnosis control is to detect deterioration of the ozone purifying function of activated carbon on the basis of a temperature in the above-described predetermined region which changes during an injection of ammonia from the injector 20. FIG. 5 is a support image diagram of the deterioration detection substance. As illustrated in FIG. 5, the deterioration detection substance is distributed and supported on the surface and in the pores of the activated carbon. Among them, the deterioration detection substance supported in the fine pores drops with loss of the fine pores. If the deterioration detection substance drops, the support amount of the deterioration detection substance decreases, and a temperature difference of the predetermined region detected before and after the ammonia injection becomes smaller than that at the initial stage (i.e. unused state of the radiator 14).

Figure 6:
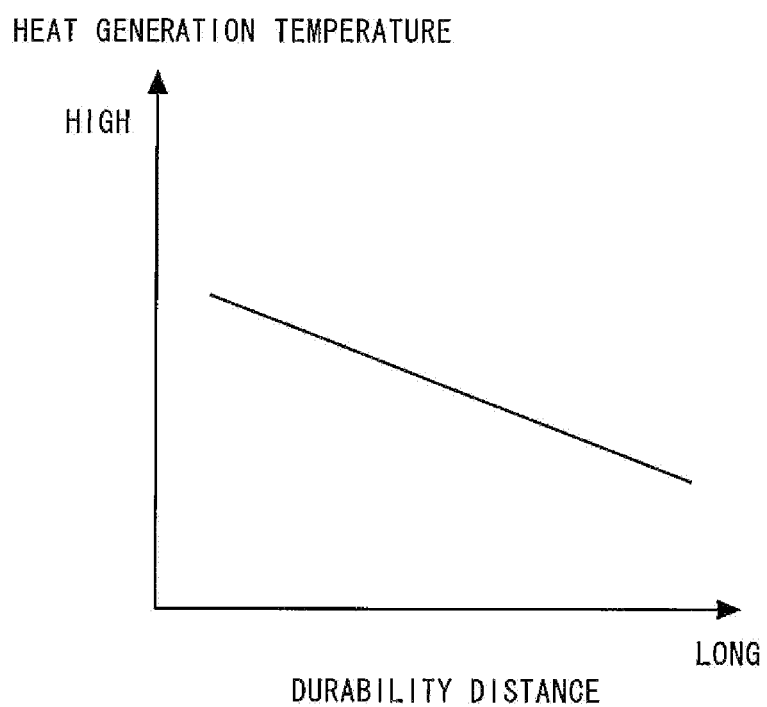
FIG. 6 is a diagram illustrating a relationship between a heat generation temperature and a durability distance of the activated carbon.

FIG. 6 is a diagram illustrating a relationship between a heat generation temperature and a durability distance of the activated carbon. The relationship in FIG. 6 was created by measuring a bed temperature difference of activated carbon (a test piece with a deterioration detection substance) before and after the ammonia injection at each durability distance (bed temperature difference=highest bed temperature after injection−bed temperature before injection). As illustrated in FIG. 6, as the durability distance becomes longer, the heat generation temperature decreases. In this embodiment, a deterioration determination value (predetermined value A) is set on the basis of the relationship illustrated in FIG. 6 and is stored in the ECU 40 in advance.

Specific Processing

Figure 7:
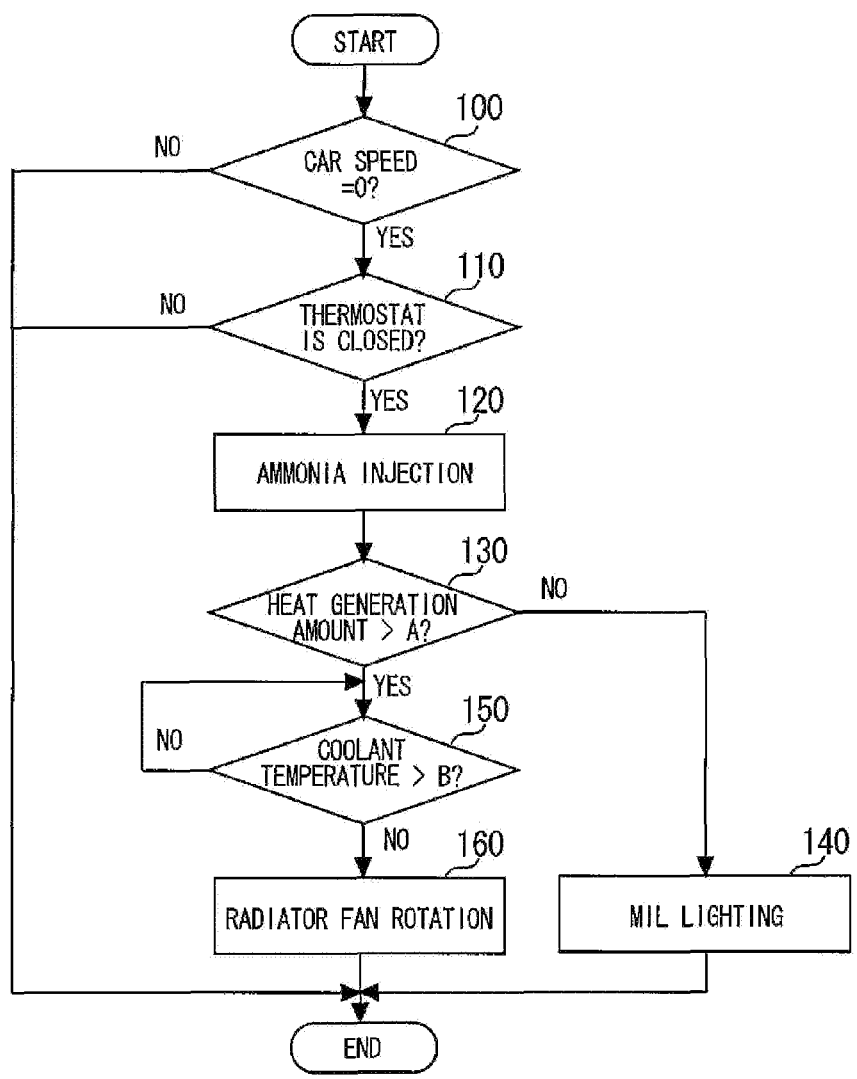
FIG. 7 is a flowchart illustrating deterioration diagnosis control executed by the ECU 40 in the first embodiment.

FIG. 7 is a flowchart illustrating deterioration diagnosis control executed by the ECU 40 in the first embodiment. The routine illustrated in FIG. 7 is repeatedly executed at regular intervals during operation of the engine 12.

In the routine illustrated in FIG. 7, first, the ECU 40 determines whether the car speed is zero or not (Step 100). Specifically, the ECU 40 determines whether or not the car speed=0 by using a sensor output of the car speed sensor 24. In the case of the car speed>0, the ECU 40 finishes this routine. In the case of the car speed=0, the ECU 40 proceeds to Step 110.

At Step 110, the ECU 40 determines whether or not the thermostat 28 is closed. Specifically, the ECU 40 determines whether or not the thermostat 28 is in a valve-closed state by using a sensor output of the water temperature sensor 26. When the coolant temperature is a set temperature (80° C., for example) or above, the thermostat 28 is opened. That is, when the coolant temperature is lower than the set temperature, it can be determined that the thermostat 28 is closed, and the ECU 40 proceeds to Step 120. When the coolant temperature is at the set temperature or above, the ECU 40 finishes this routine.

At Step 120, the ECU 40 starts applying current to the injector 20. As a result, ammonia injection from the injector 20 is started. Subsequently, the ECU 40 determines whether or not a heat generation amount is more than the predetermined amount A (Step 130). Specifically, the ECU 40 calculates the heat generation amount by integrating the sensor outputs of the temperature sensor 22 which has been obtained since immediately after starting the energization of the injector 20 and then compares the result with the predetermined amount A. In the case of the heat generation amount>predetermined amount A, it can be determined that there are a large number of fine pores supporting the deterioration detection substance. Thus, the ECU 40 proceeds to processing at Step 150 and after. In the case of the heat generation amount≤predetermined amount A, it can be determined that the fine pores have decreased and the ozone purifying function of the activated carbon has deteriorated. Thus, the ECU 40 lights the MIL 30 (Step 140).

At Steps 150 and 160, the ECU 40 executes reproduction processing of the deterioration detection substance. First, the ECU 40 determines whether or not a coolant temperature is more than set temperature B (Step 150). The set temperature B is 80° C., for example. In the case of the coolant temperature≤set temperature B, the ECU 40 waits until the coolant temperature becomes higher than set temperature B. In the case of coolant temperature>set temperature B, the thermostat 28 is opened and the coolant flows into the radiator 14, and ammonia coordinated in the deterioration detection substance is emitted. Subsequently, the ECU 40 rotates the radiator fan 16 at a set rotation speed C or more (Step 160). As a result, all the ammonia emitted from the deterioration detection substance move to the rear of the radiator 14 (that is, on the engine 12 side).

As described above, according to the routine illustrated in FIG. 7, deterioration of activated carbon can be diagnosed by using the temperature sensor 22 and the injector 20. That is, function deterioration of activated carbon can be diagnosed with an inexpensive and simple configuration.

In this first embodiment, ammonia in the ammonia tank was injected from the injector 20. However, if the vehicle 10 is provided with an SCR (Selective Catalytic Reduction) system, the ammonia tank may be omitted. The SCR system is generally provided with a urea tank storing urea which is used as a reducing agent for NOx. Moreover, if urea is heated, ammonia is generated. Thus, if the vehicle 10 is provided with the SCR system with a urea tank, ammonia can be generated from urea water by exhaust heat of the engine 12 and be injected from the injector 20, and thus, the ammonia tank can be omitted.

In the above-described first embodiment, the radiator 14 corresponds to the "on-vehicle component" in the first aspect of the present invention and the temperature sensor 22 corresponds to "obtaining means" of the same invention.

Moreover, "diagnosing means" of the first aspect of the present invention is implemented when the ECU 40 performs steps 130 and 140 in FIG. 7.

Moreover, the injector 20 corresponds to "injecting means" in the second aspect of the present invention.

Moreover, "alarm means" of the fifth aspect of the present invention is implemented when the ECU 40 performs step 140 in FIG. 7.

Second Embodiment

Subsequently, a second embodiment of the present invention will be described by referring to FIG. 8.

This embodiment is characterized in that function deterioration of activated carbon is diagnosed by using a property of a heat storage material which generates heat by reacting with water or alcohol. Thus, this feature will be mainly described in the following, and description of a point in common with the first embodiment will be omitted.

In this embodiment, a water tank (not shown) is connected to the injector 20. Moreover, in this embodiment, a heat storage material as a deterioration detection substance is distributed and supported on the surface and in the pores of activated carbon. The heat storage material such as MgO and CaO has a property of reacting with water or alcohol and generating heat. CaO, for example, reacts with water and generates $Ca(OH)_2$ while generating heat. Thus, in this embodiment, deterioration diagnosis control for detecting deterioration of the ozone purifying function of activated carbon is executed on the basis of the temperature of the above-described predetermined region which changes during an injection of water from the injector 20.

Moreover, hydroxides such as $Mg(OH)_2$, $Ca(OH)_2$ have a property of dehydration by heating. Thus, in this embodiment, the heat storage material is heated by using an electric heater separately mounted on the vehicle 10 for regeneration. The heater is connected to the output side of the ECU 40.

Specific Processing

Figure 8:
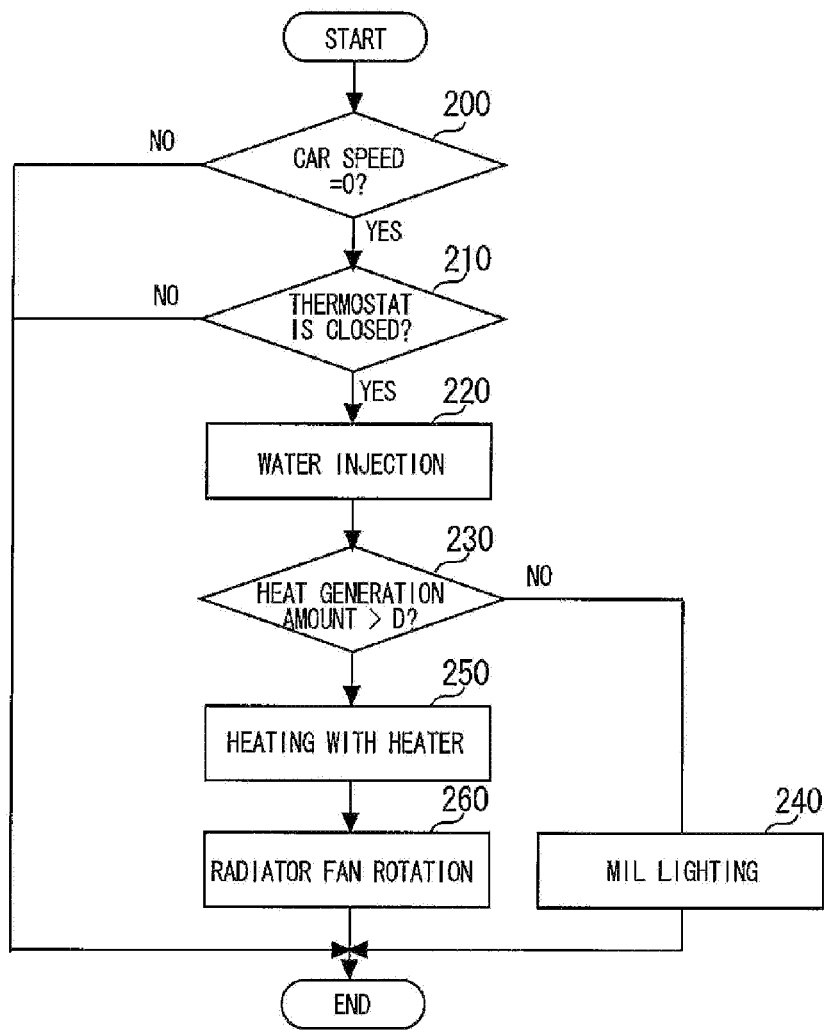
FIG. 8 is a flowchart illustrating deterioration diagnosis control executed by the ECU 40 in the second embodiment.

FIG. 8 is a flowchart illustrating deterioration diagnosis control executed by the ECU 40 in the second embodiment. The routine illustrated in FIG. 8 is repeatedly executed at regular intervals during operation of the engine 12.

In the routine illustrated in FIG. 8, first, the ECU 40 executes processing at Steps 200 and 210. These processes are the same as the processes at Steps 100 and 110 in FIG. 7.

At Step 210, when the coolant temperature is lower than the set temperature, the ECU 40 starts applying current to the injector 20 (Step 220). As a result, water injection from the injector 20 is started. Subsequently, the ECU 40 determines whether or not a heat generation amount is more than a predetermined amount D (Step 230). Specifically, the ECU 40 calculates the heat generation amount by integrating the sensor outputs of the temperature sensor 22 having been obtained since immediately after starting the energization of the injector 20 and compares the result with the predetermined amount D. The predetermined amount D is set on the basis of a relationship between the heat generation temperature of activated carbon and the durability distance created similarly to FIG. 6 and to be stored in the ECU 40.

At Step 230, in the case of heat generation amount>predetermined amount D, it can be determined that there are a large number of fine pores supporting the deterioration detection substance. Thus, the ECU 40 proceeds to processing at Step 250 and after. In the case of the heat generation amount≤predetermined amount D, it can be determined that the fine pores have decreased, and the ozone purifying function of activated carbon has deteriorated. Thus, the ECU 40 lights the MIL 30 (Step 240).

At Step 250, the ECU 40 executes reproduction processing of the deterioration detection substance. Specifically, the ECU 40 starts applying current to the heater. As a result, the deterioration detection substance (hydroxide) is heated and dehydrated. Subsequently, the ECU 40 rotates the radiator fan 16 at a set rotation speed E or more (Step 260). As a result, all the moisture desorbed from the deterioration detection substance moves to the rear of the radiator 14.

As described above, according to the routine illustrated in FIG. 8, deterioration of activated carbon can be diagnosed by using the temperature sensor 22 and the injector 20. That is, the same effect as that in the above-described first embodiment can be obtained.

In the above-described second embodiment, the heat storage material was heated by using the heater, but the heat storage material may be heated by using exhaust heat of the engine 12.

Third Embodiment

Subsequently, a third embodiment of the present invention will be described by referring to FIGS. 9 to 11.

This embodiment is characterized in that function deterioration of activated carbon is diagnosed by using a property of a photoluminescence fluorescent substance. Thus, this feature will be mainly described in the following, and description of a point in common with the first and second embodiments will be omitted.

Configuration of Air-Purifying Device for Vehicles

Figure 9:
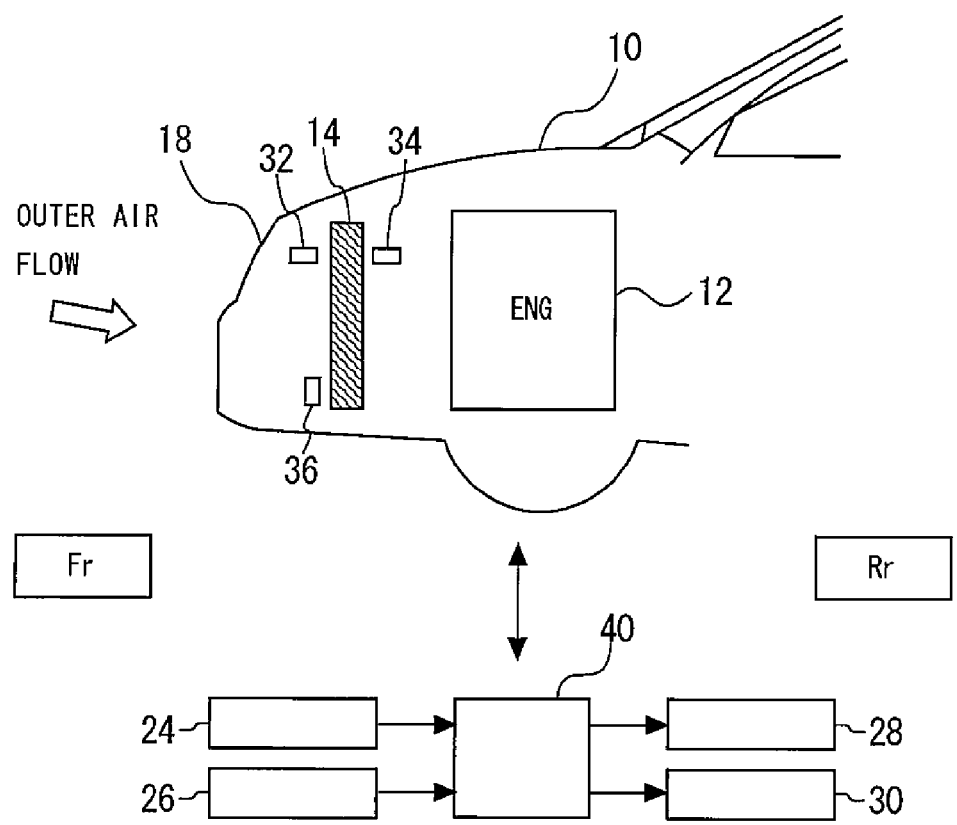
FIG. 9 is a diagram illustrating a configuration of a vehicle on which an air-purifying device of the third embodiment is mounted.

FIG. 9 is a diagram illustrating a configuration of a vehicle on which an air-purifying device of the third embodiment is mounted. As illustrated in FIG. 9, the vehicle 10 is provided with a light emitting portion 32 incorporating a light emitting element and a light receiving portion 34 incorporating a light receiving element. The light emitting portion 32 and the light receiving portion 34 are arranged facing each other with the radiator 14 between them. The light emitting portion 32 is connected to the output side of the ECU 40 and the light receiving portion 34 is connected to the input side of the ECU 40. Moreover, the vehicle 10 is provided with a humidity sensor 36 detecting humidity of the front of the radiator 14. The humidity sensor 36 is connected to the input side of the ECU 40.

In this embodiment, the photoluminescence fluorescent substance as a deterioration detection substance is distributed and supported on the surface and in the pores of the activated carbon. The photoluminescence fluorescent substance ($Ti_2O$ fluorescent substances, Fe containing zeolite, for example) has a property of emitting light with a different wavelength if it is irradiated with light with a certain wavelength. Thus, in this embodiment, deterioration diagnosis control of detecting deterioration of the ozone purifying function of activated carbon is executed on the basis of intensity of fluorescent light detected by the light receiving portion 34 in light irradiation from the light emitting portion 32. The wavelength of light projected from the light emitting portion 32 and the wavelength of fluorescent light detected by the light receiving portion 34 are determined in advance in accordance with the property of the photoluminescence fluorescent substance.

Figure 10:
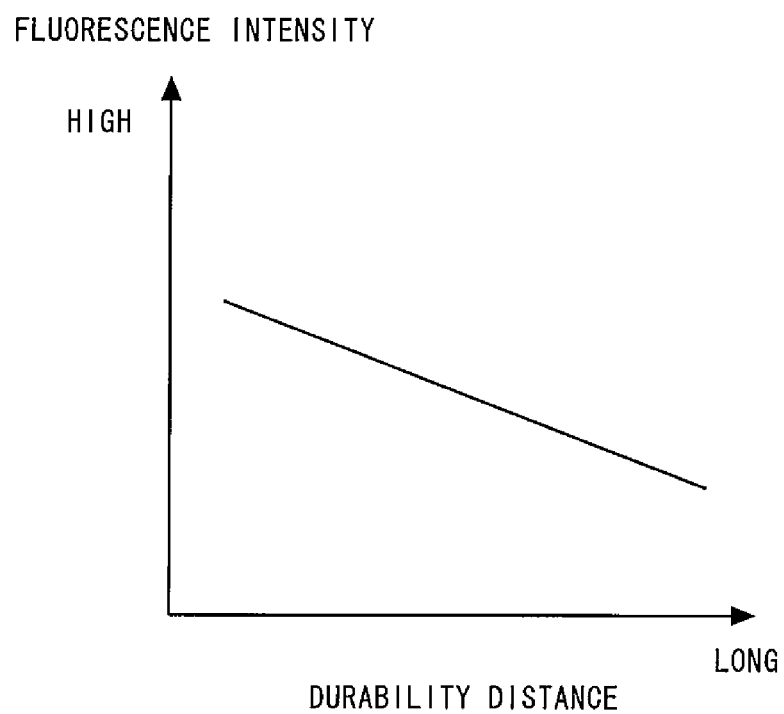
FIG. 10 is a diagram illustrating a relationship between fluorescence intensity of activated carbon and the durability distance.

FIG. 10 is a diagram illustrating a relationship between fluorescence intensity of activated carbon and the durability distance. The relationship in FIG. 10 was created by measuring the fluorescence intensity of the activated carbon (test piece with deterioration detection substance) detected after irradiation of light at each durability distance. As illustrated in FIG. 10, as the durability distance becomes longer, the fluorescence intensity becomes lower. In this embodiment, a deterioration determination value (predetermined amount F) is set on the basis of the relationship illustrated in FIG. 10 and is stored in the ECU 40 in advance.

Specific Processing

Figure 11:
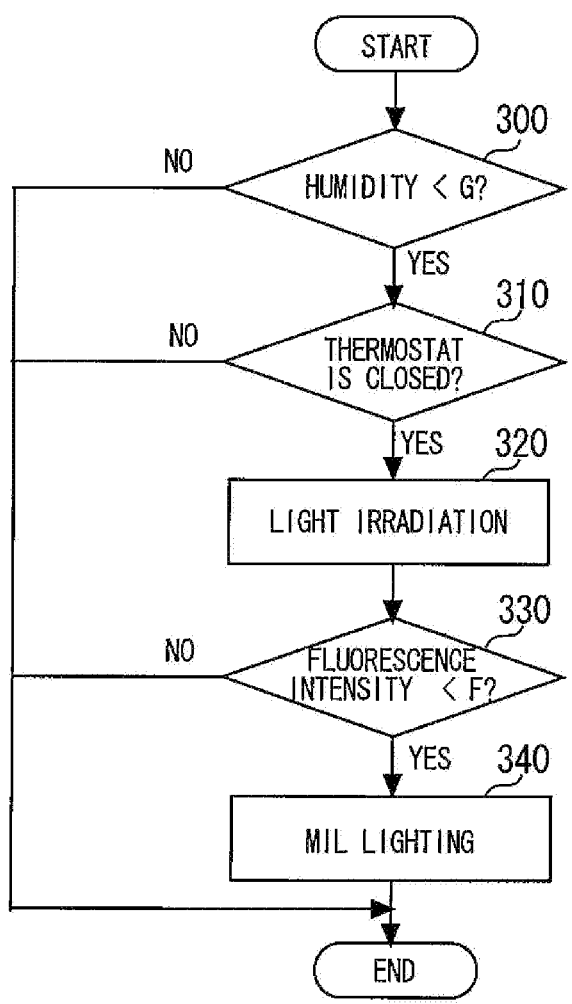
FIG. 11 is a flowchart illustrating deterioration diagnosis control executed by the ECU 40 in the third embodiment.

FIG. 11 is a flowchart illustrating deterioration diagnosis control executed by the ECU 40 in the third embodiment. The routine illustrated in FIG. 11 is repeatedly executed at regular intervals during operation of the engine 12.

In the routine illustrated in FIG. 11, first, the ECU 40 determines whether or not a precondition is fulfilled (Steps 300 and 310). Specifically, the ECU 40 determines whether or not humidity around the ozone purifier (moisture condition) is lower than a predetermined humidity G (Step 300) by using the sensor outputs of the humidity sensor 36. Moreover, the ECU 40 determines whether or not the thermostat 28 is in the closed valve state by using the sensor output of the water temperature sensor 26 (Step 310). If the precondition is fulfilled, the ECU 40 proceeds to Step 320. If the precondition is not true, the ECU 40 finishes this routine.

At Step 320, the ECU 40 sends an instruction of emitting light to the light emitting portion 32. As a result, light with a specific wavelength is projected from the light emitting portion 32 to the radiator 14. Subsequently, the ECU 40 determines whether or not fluorescence intensity is lower than the predetermined amount F (Step 330). Specifically, the ECU 40 calculates intensity of a specific fluorescence wavelength from a signal obtained from the light receiving portion 34 and then compares the result with the predetermined amount F. In the case of fluorescence intensity<predetermined amount F, it can be determined that the fine pores have decreased and the ozone purifying function of activated carbon has deteriorated. Thus, the ECU 40 lights the MIL 30 (Step 340). In the case of fluorescence intensity≥predetermined value F, it can be determined that there are a large number of fine pores supporting the deterioration detection substance. Thus, the ECU 40 finishes this routine.

As described above, according to the routine illustrated in FIG. 11, deterioration of activated carbon can be diagnosed by using the light emitting portion 32 and the light receiving portion 34. That is, the same effect as that in the above-described first embodiment can be obtained.

In the above-described third embodiment, the light emitting portion 32 corresponds to "irradiating means" in the third aspect of the present invention and the light receiving portion 34 to "obtaining means" in the same invention, respectively.

It will be obvious to those having skill in the art that many changes may be made in the above-described details of the present invention, therefore, should be determined by the following claims.

What is claimed is:

1. An air-purifying device for vehicles, comprising:
an on-vehicle component arranged on a portion where an air flow passage is formed while a vehicle is traveling;
an ozone purifier provided on said on-vehicle component and containing activated carbon having a function of purifying ozone, and a deterioration detection substance supported by pores of said activated carbon and detecting deterioration of said activated carbon;
obtaining means for obtaining a parameter which is set in accordance with a property of said deterioration detection substance; and
diagnosing means for diagnosing deterioration of said function by comparing said parameter with a predetermined threshold value.

2. The air-purifying device for vehicles according to claim 1, wherein
said deterioration detection substance has a property of generating heat by chemical reaction with ammonia or water;
injecting means for injecting ammonia or water toward said ozone purifier is further provided; and
said obtaining means obtains, as said parameter, a heat generation amount of said deterioration detection substance generated by injection from said injecting means.

3. The air-purifying device for vehicles according to claim 1, wherein
said deterioration detection substance has a property of absorbing light with a specific wavelength and emitting light;
irradiating means for irradiating light with said specific wavelength toward said ozone purifier is further provided; and
said obtaining means obtains, as said parameter, light emission intensity of said deterioration detection substance emitted by light irradiation from said irradiating means.

4. The air-purifying device for vehicles according to claim 1, wherein
said on-vehicle component is a radiator.

5. The air-purifying device for vehicles according to claim 1, wherein
said diagnosing means is further provided with alarm means for alarming to the outside when said function is diagnosed to have deteriorated.

6. An air-purifying device for vehicles, comprising:
an on-vehicle component arranged on a portion where an air flow passage is formed while a vehicle is traveling;
an ozone purifier provided on said on-vehicle component and containing activated carbon having a function of purifying ozone, and a deterioration detection substance supported by pores of said activated carbon and detecting deterioration of said activated carbon;
a processor; and
a memory storing a program which is a control program executed by said processor and diagnoses deterioration of said function by obtaining a parameter which is set in accordance with a property of said deterioration detection substance and by comparing said parameter with a predetermined threshold value.

7. The air-purifying device for vehicles according to claim 6, wherein
said deterioration detection substance has a property of generating heat by chemical reaction with ammonia or water;
an injector injecting ammonia or water toward said ozone purifier is further provided; and
said parameter is a heat generation amount of said deterioration detection substance generated by injection from said injector.

8. The air-purifying device for vehicles according to claim 6, wherein
said deterioration detection substance has a property of absorbing light with a specific wavelength and emitting light;
a light emitting portion irradiating light with said specific wavelength toward said ozone purifier is further provided; and
said parameter is light emission intensity of said deterioration detection substance emitted by light irradiation from said light emitting portion.

9. The air-purifying device for vehicles according to claim 6, wherein
said on-vehicle component is a radiator.

10. The air-purifying device for vehicles according to claim 6, wherein
an MIL being lighted by a signal from said processor is further provided; and
said program lights said MIL when said function is diagnosed to have deteriorated.

* * * * *